United States Patent [19]

Onaka et al.

[11] Patent Number: 5,246,279
[45] Date of Patent: Sep. 21, 1993

[54] ANTI-SKID BRAKE SYSTEM FOR AN AUTOMOTIVE VEHICLE INCLUDING BRAKE FORCE CONTROL

[75] Inventors: Toru Onaka; Toshiaki Tsuyama; Kazutoshi Nobumoto; Yoji Kurihara, all of Hiroshima, Japan

[73] Assignee: Mazda Motor Corporation, Hiroshima, Japan

[21] Appl. No.: 794,249

[22] Filed: Nov. 19, 1991

[30] Foreign Application Priority Data

Nov. 19, 1990 [JP] Japan ................... 2-313061

[51] Int. Cl.⁵ .............................................. B60T 8/68
[52] U.S. Cl. ................... 303/109; 303/100; 364/426.02
[58] Field of Search ............. 303/100, 110, 109, 95, 303/96, 105, 106, 107, 108; 364/426.2

[56] References Cited

U.S. PATENT DOCUMENTS

| 4,089,564 | 5/1978 | Oberg | 303/109 |
| 4,774,668 | 9/1988 | Matsubara et al. | 303/109 |
| 4,787,682 | 11/1988 | Muto | 303/109 |
| 4,802,711 | 2/1984 | Muto et al. | 303/109 |
| 4,807,941 | 2/1989 | Onogi et al. | 303/109 X |
| 4,912,744 | 3/1990 | Hurst | 303/109 |

FOREIGN PATENT DOCUMENTS

61-196853 9/1986 Japan .

Primary Examiner—Matthew C. Graham
Attorney, Agent, or Firm—Fish & Richardson

[57] ABSTRACT

An assumed vehicle body speed is determined on the basis of the wheel speed detected by a wheel speed sensor for each wheel and a slip value indicating the tendency of locking the wheel is determined for a predetermined wheel speed on the basis of the assumed vehicle body speed and a wheel speed of the predetermined wheel. The braking force is controlled on the basis of the slip value. When no braking force is controlled and when at least one of the wheel speeds for all the wheels detected by the wheel speed sensors is larger than the assumed vehicle body speed previously determined, a new assumed vehicle body speed which follows is inhibited from being renewed to a larger value and the new assumed vehicle body speed is set as a value equal to the previous assumed vehicle body speed.

16 Claims, 6 Drawing Sheets

ANTI-SKID BRAKE SYSTEM FOR AN AUTOMOTIVE VEHICLE INCLUDING BRAKE FORCE CONTROL

BACKGROUND OF THE INVENTION

1. Field of the Invention

The present invention relates to an anti-skid brake system for an automotive vehicle.

2. Description of the Related Art

Recently, an increasing number of automotive vehicles are loaded with an anti-skid brake system (usually called the "ABS system") which is arranged to prevent the wheel from being locked at the moment of braking. In order to operate the anti-skid brake system, basically, it is required to determine a slip value of the wheel that is incipiently locked and the slip value is determined on the basis of a speed of the vehicle body and speeds of the wheels.

Generally speaking, as disclosed in Japanese Patent Laid-Open Publication (kokai) No. 196,853/1986, the slip value is determined on the basis of a vehicle body speed assumed from the wheel speeds. Further, the fastest wheel speed among the four wheel speeds is employed as the assumed vehicle body speed.

Recently, there has been desired such an anti-skid brake system as capable of shortening the braking distance as much as possible. At this end, the assumed vehicle body speed is required to be determined as a value that is closest to an actual vehicle body speed. Even if the actual vehicle body speed is identical to the wheel speed, it is determined that the wheel has the tendency that the wheel is more incipiently locked as the assumed vehicle body speed becomes larger, and the anti-skid brake system is controlled more frequently by decreasing the braking liquid pressure, resulting in an increase of a total quantity of control and leading to eventually prolonging the braking distance.

The automotive vehicle is often accelerated before the start of control of the anti-skid brake system and the speed of the driven wheel may become considerably higher than the actual vehicle body speed. Hence, if the assumed vehicle body speed is determined on the basis of the speed of the driven wheel, the timing at which the control of the anti-skid brake system is performed may be put forward or the quantity of control at the moment of starting the control of the anti-skid brake system may become larger, thereby causing the problem with shortening the braking distance.

SUMMARY OF THE INVENTION

The object of the present invention is to provide an anti-skid brake system for an automotive vehicle so adapted as to perform the control of the anti-skid brake system by determining an assumed vehicle body speed in an appropriate fashion by removing noises accompanied with acceleration of the vehicle body.

In order to achieve the aforesaid object, the present invention consists of an anti-skid brake system for an automotive vehicle, wherein an assumed vehicle body speed is renewed to a value larger than the previous assumed vehicle body speed only when all new wheel speeds of the wheels of the automotive vehicle are larger than the previous vehicle body speed, if no control of the anti-skid brake system is performed.

More particularly, the anti-skid brake system according to the present invention is characterized by wheel speed detecting means for detecting a wheel speed of each wheel independently;

assumed vehicle body speed determining means for determining an assumed vehicle body speed based on the wheel speed of each wheel detected by the wheel speed detecting means;

slip value determining means for determining a slip value of a predetermined wheel being incipiently locked on the basis of the wheel speed of the predetermined wheel detected by the wheel speed detecting means and the assumed vehicle body speed determined by the assumed vehicle body speed means;

braking force controlling means for controlling braking force for the predetermined wheel so as not to lock the predetermined wheel at the moment of braking on the basis of the slip value determined by the slip value determining means; and inhibition means for inhibiting a next assumed vehicle body speed determined by the assumed vehicle body speed determining means from being renewed as a value larger than a previous assumed vehicle body speed determined immediately before the next assumed vehicle body speed, when no control is performed by the braking force controlling means and when the wheel speed of each wheel detected by the wheel speed detecting means is equal to or smaller than the previous assumed vehicle body speed determined by the assumed vehicle body speed determining means.

By setting the condition that the assumed vehicle body speed is renewed to a new and larger value when all new wheels speeds are higher than the previous vehicle body speed, the new assumed vehicle body speed is prevented from being set on the basis of the wheel speed of the driven wheel having the wheel speed larger to a considerable extent than the actual vehicle body speed when the vehicle body is accelerated immediately before the start of the control of the anti-skid brake system.

Further, when the actual vehicle body speed becomes larger than the previous one due to acceleration, all the wheel speeds become higher than the previous assumed vehicle body speed, so that the next assumed vehicle body speed is renewed to a value larger than the previous assumed vehicle body speed so as to correspond to the actual vehicle body speed.

The aforesaid arrangement can appropriately perform the control of the anti-skid brake system by determining the assumed vehicle body speed in an appropriate fashion.

Other objects, features and advantages of the present invention will become apparent in the course of the description of the preferred embodiments, which follows, with reference to the accompanying drawings.

DETAILED DESCRIPTION OF THE PREFERRED EMBODIMENTS

Figure 1:
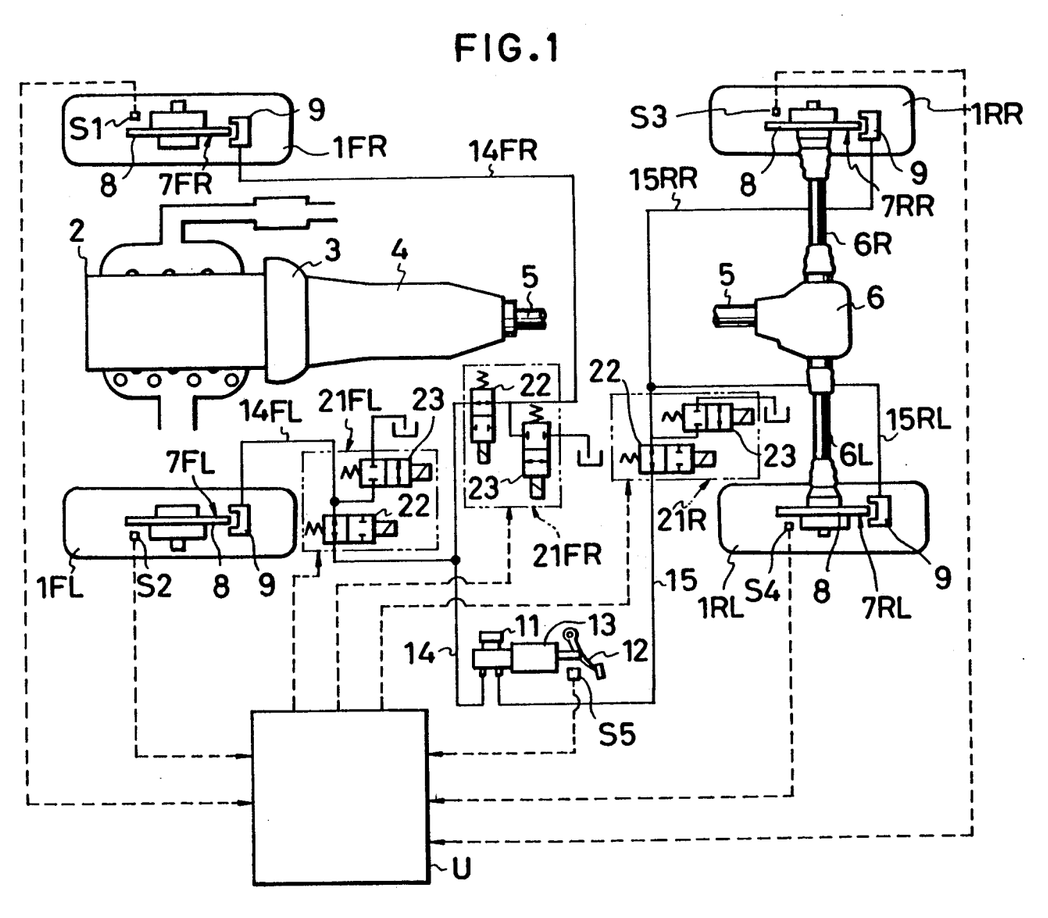
FIG. 1 is a system representation showing an outline of the anti-skid brake system according to an embodiment of the present invention.

As shown in FIG. 1, reference numeral 1FR stands for a right-hand front wheel, reference numeral 1FL for a left-hand front wheel, reference numeral 1RR for a right-hand rear wheel and reference numeral 1RL for a left-hand rear wheel. The output torque of an engine 2 is transmitted through a clutch 3, a transmission 4, a propeller shaft 5 and a differential 6 to a right-hand driving shaft 6R and a left-hand driving shaft 6L, through which the output torque is transmitted to the right-hand rear wheel 1RR and the left-hand rear wheel 1RL, respectively.

Mounted to the wheels 1FR, 1FL, 1RR and 1RL are braking units 7FR, 7FL, 7RR and 7RL, respectively, each of which has a disc 8 arranged so as to be rotatable integrally with the respective wheel and a caliper 9 with a wheel cylinder built therein.

Reference numeral 11 denotes a master cylinder as means for generating braking oil pressure, and a force obtained by depressing a braking pedal 12 is entered into the master cylinder 11 through a servo-mechanism 13. The master cylinder 11 is of a tandem type having two outlets, and a braking pipe 14 extending from one of the outlets branches into two branch pipe sections at its intermediate position. The right-hand branch pipe sections 14FR is connected to the wheel cylinder of the brake unit 7FR for the right-hand front wheel, while the left-hand branch pipe section 14FL is connected to the wheel cylinder of the brake unit 7FL for the left-hand front wheel. Further, a braking pipe 15 extending from the other outlet of the master cylinder 11 branches into two branch pipe sections at its intermediate position, and the right-hand branch pipe section 15RR is connected to the wheel cylinder of the brake unit 7RR for the right-hand rear wheel while the left-hand branch pipe section 15RL is connected to the wheel cylinder of the brake unit 7RL for the left-hand rear wheel.

A right-hand oil pressure adjusting mechanism 21FR is connected to the right-hand branch pipe section 14FR for the right-hand front wheel and a left-hand oil pressure adjusting mechanism 21FL is connected to the left-hand branch pipe section 14FL for the left-hand front wheel. On the other hand, a common oil pressure adjusting mechanism 21R is connected to the common pipe 15 for the right-hand and left-hand rear wheels. Each of the oil pressure adjusting mechanisms 21FR, 21FL and 21R has a first opening-closing valve 22 and a second opening-closing valve 23, each of the first and second opening-closing valves 22 and 23 being of an electromagnetic type. The first opening-closing valve 22 opens or closes the right-hand pipe section 14FR, the left-hand pipe section 14FL or the common pipe 15, while the second opening-closing valve 23 opens or closes a passage communicating each of the pipes with a reserve tank. This arrangement can shift the braking oil pressure to be supplied to the brake units 7FR, 7FL, 7RR and 7RL so as to be increased, decreased or retained, when the wheels are braked by the braking oil pressure generated in the master cylinder 11. In other words, the braking oil pressure is decreased by closing the first opening-closing valve 22 and opening the second opening-closing valve 23, the braking oil pressure is increased by opening the first opening-closing valve 22 and closing the second opening-closing valve 23, and the oil pressure is retained by closing both of the first and second opening-closing valves 22 and 23. It is further to be noted in this embodiment that the braking oil pressure is rapidly increased in the initial stage of an increase in the braking oil pressure and the rate of the increase in the oil pressure is slowed down while increasing the oil pressure gradually. This control is implemented, for example, by subjecting a speed (an angle) of opening the first opening-closing valve 22 to duty control.

In FIG. 1, reference symbol U denotes a control unit composed of a microcomputer with CPU, ROM, RAM, CLOCK, I/O interface, etc. built therein. Entered into the control unit U are signals from switches S1, S2, S3 and S4, which are to sense speeds of rotation of the right-hand and left-hand front wheels 1FR and 1FL as well as the right-hand and left-hand rear wheels 1RR and 1RL, respectively. Further, a signal from a switch S5 is entered, which is a brake switch that is turned on when the braking pedal 12 is depressed. The control unit U controls the oil pressure adjusting mechanisms 21FR, 21FL and 21R, while the control unit U performs the ABS control for the right-hand and left-hand front wheels 1FR and 1FL in an independent and separate manner as well as for the right-hand and left-hand rear wheels 1RR and 1RL in an integrated manner. It is to be noted that the ABS control is performed when the brake switch S5 is turned on.

FIG. 2

The contents of the ABS control by the control unit U will be described with reference to FIG. 2. In performing the ABS control, phases 0, 1, 2, 3 and 5 are employed, which have the following meanings:

Phase 0: non-ABS control
Phase 1: increasing pressure
Phase 2: retaining pressure after non-ABS control or after increasing pressure
Phase 3: decreasing pressure
Phase 5: retaining pressure after decreasing pressure The slip value indicating the tendency of locking the wheel is determined by the following formula:

$$Slip\ value = (wheel\ speed/assumed\ vehicle\ body\ speed) \times 100\%$$

Given the foregoing, no ABS control is performed up to the time t1 (phase 0) and the wheel speed is slowed down gradually to a level slower than the assumed vehicle body speed as the braking oil pressure is elevated. By slowing the wheel speed down, the deceleration of the wheel speed is increased and reaches a predetermined value at the time t1, i.e. moment A, which satisfies the condition under which to start the ABS control, i.e. control by the anti-skid brake system.

As the ABS control starts at the moment A, the braking oil pressure is first retained. The wheel speed is slowed down, however, while the braking oil pressure is retained. As the slip value is decreased and reaches a predetermined threshold value at the moment B (phase 2), then the oil pressure starts decreasing and the extent to which the wheel speed is slowed down becomes so slow that the deceleration reaches approximately zero at the moment C (phase 3).

At the moment C when the deceleration has reached approximately zero, the braking oil pressure is retained as it is, thereby increasing the wheel speed gradually and returning the slip value to the predetermined threshold value at the moment D (phase 5). From the moment D, the braking oil pressure is increased in such a manner that it is increased in the initial stage to such an extent as the rate of increasing the braking oil pressure is so rapid and thereafter to a slower extent. It is noted that phase 1 continues from the moment D to the moment E.

By increasing the braking oil pressure at the moment D, the deceleration of the wheel speed is increased again and reaches the predetermined value satisfying the condition for the start of the ABS control at the moment E. Then, the braking oil pressure is retained from the moment E up to the moment F at which the slip value is lowered to a predetermined threshold value (phase 2), followed by reducing the braking oil pressure up to the moment G (phase 3) corresponding to the moment C. After the moment G, the braking oil pressure is retained (phase 5).

The arrangement as described hereinabove is an outline of the ABS control, i.e. the control by the anti-skid brake system. One control cycle continues from the moment D at which phase 5 ends, i.e. from the moment when the braking oil pressure has been decreased and starts increasing, to the end of the next phase 5. In other words, one control cycle comprises phases 1, 2, 3 and 5. It is to be noted herein that only the very first control cycle comprises phases 2, 3 and 5 because the ABS control starts from the phase 2.

The threshold value at which the phase is changed varies with a friction coefficient $\mu$ on a road surface, i.e. a road surface friction coefficient $\mu$. An example of setting the threshold values in accordance with the road surface friction coefficient $\mu$ is shown as follows:

| Road Surface Friction Coefficient $\mu$ | Phases | | |
|---|---|---|---|
| | 1 → 2 | 2 → 3<br>5 → 1 | 3 → 5 |
| 1 (Low) | −0.5G | 95% | 0G |
| 2 (Medium) | −1.0G | 90% | −0.2G |
| 3 (High) | −1.5G | 85% | −0.5G |

FIG. 3

Figure 3:
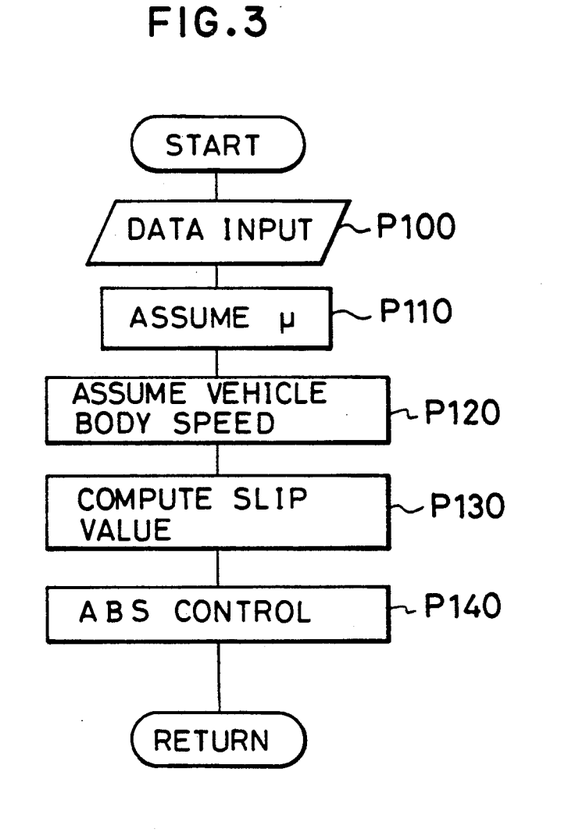
FIG. 3 is a flow chart showing an example of the control relating to the present invention.

FIG. 3 shows the flow chart showing an example of the control relating to the present invention.

First, at step P100, signals are entered into the control unit U from the switches S1 to S5, followed by proceeding to step P110 at which the road surface friction coefficient $\mu$ is assumed. Then, at step P120, the vehicle body speed is assumed to determine the assumed vehicle body speed and, at step P130, the slip value for the ABS control is computed, followed by proceeding to step P140 at which the ABS control is implemented.

FIG. 4

Figure 4:
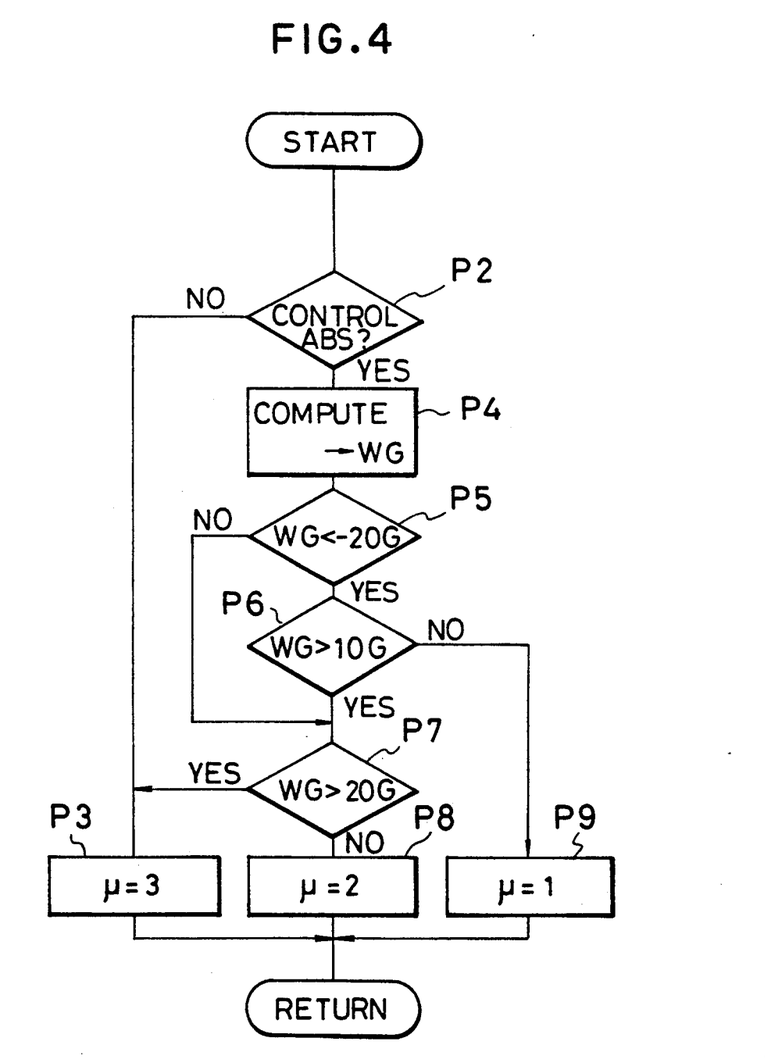
FIG. 4 illustrates the flow chart for assuming the road surface friction coefficient $\mu$ according to the contents at step P110 of FIG. 3.

FIG. 4 shows the practices for assuming the road surface friction coefficient $\mu$ according to the contents at step P110 of FIG. 3.

First, at step P2, a decision is made to determine if the ABS control is currently in progress and the road surface friction coefficient $\mu$ is set at step P3 to 3 ($\mu=3$), i.e. a high road surface friction coefficient $\mu$, when it is decided at step P2 that no ABS control is currently in progress. In other words, when no control by the anti-skid brake system is currently carried out, the road surface friction coefficient $\mu$ is forcibly set to a high value, thereby suppressing the braking oil pressure from being reduced at the initial time when the ABS control starts and reducing the braking distance.

On the other hand, when the result of decision at step P2 indicates that the ABS control is currently being performed, then the program flow goes to step P4 at which the speed of accelerating or decelerating the wheels, WG, is computed (renewed) by differentiating the wheel speeds. In computing the speed of accelerating or decelerating the wheels, WG, the maximum value for a predetermined period of time is stored in the RAM of the control unit U as acceleration, while the minimum value therefor is stored as deceleration. Then, at step P5, it is decided to determined if the deceleration (WG) is smaller than −20 G as a predetermined threshold value. It is to be noted herein that the threshold value of −20 G means a value corresponding to −20 G in a predetermined sampling cycle and this meaning is applicable likewise to the following description.

When the result of decision at step P5 indicates that the deceleration is smaller than −20G, there is the possibility that the road surface friction coefficient $\mu$ is so low that, at step P6, a decision is made to determine if the acceleration (WG) is larger than 10 G. When it is decided at step P6 that the acceleration is not larger than 10 G, then the road surface friction coefficient $\mu$ is set at step P9 to 1 ($\mu=1$), i.e. a low road surface friction coefficient $\mu$.

On the other hand, when the result of decision at step P5 inidates that the deceleration is not smaller than −20 G and the result of decision at step P6 indicates that the acceleration is larger than 10 G, then the program flow goes to step P7 at which a decision is made to determine if the acceleration (WG) is larger than 20 G. As a result of decision at step P7 indicates that the acceleration (WG) is not larger than 20 G, then the road surface friction coefficient $\mu$ is set at step P8 to 2 ($\mu=2$), i.e. a medium road surface friction coefficient $\mu$. On the other hand, when it is decided at step P7 that the acceleration is larger than 20 G, then the program flow is returned to step P3 at which the road surface friction coefficient $\mu$ is set to 3.

As described hereinabove, the road surface friction coefficient $\mu$ is assumed so as to become as high as possible while the ABS control is in progress.

FIGS. 5A & 5B

Figure 5A:
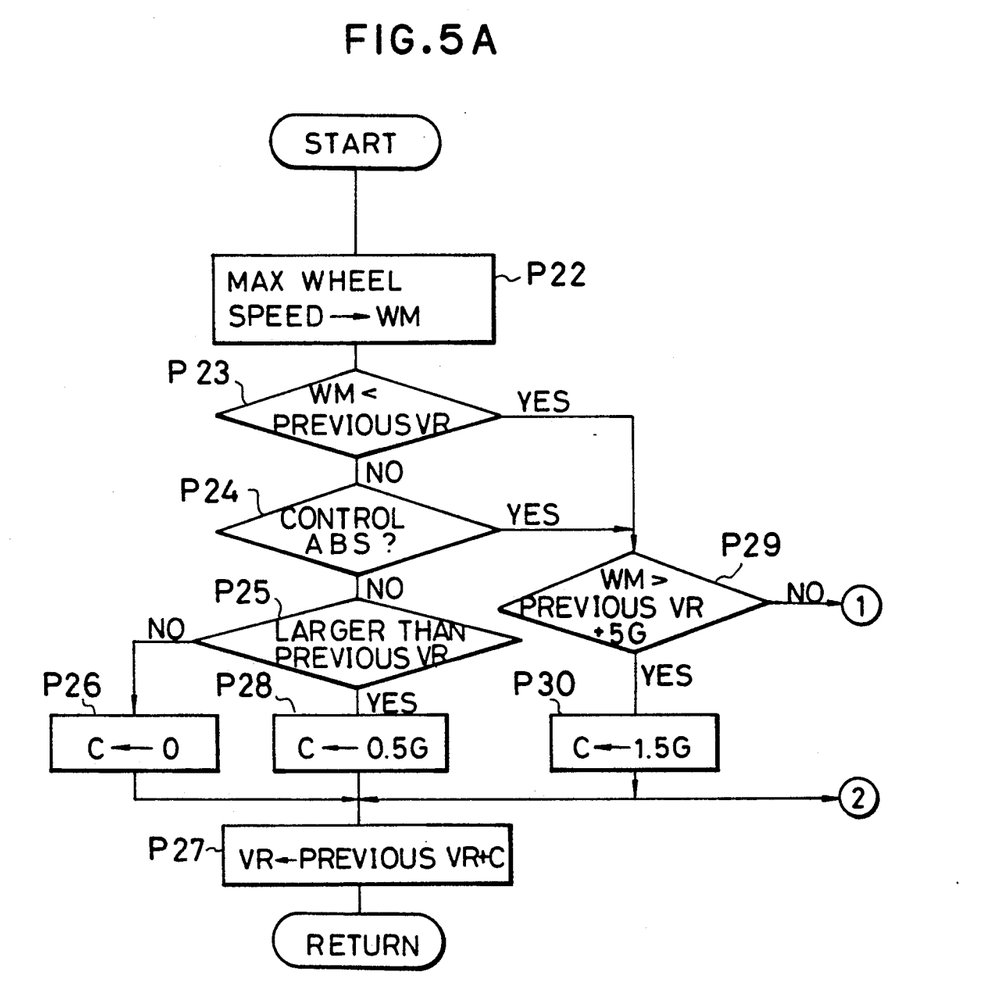
FIGS. 5A and 5B show flow charts for assuming the vehicle body speed corresponding to the contents of the control at step P120 in FIG. 3.
Figure 5B:
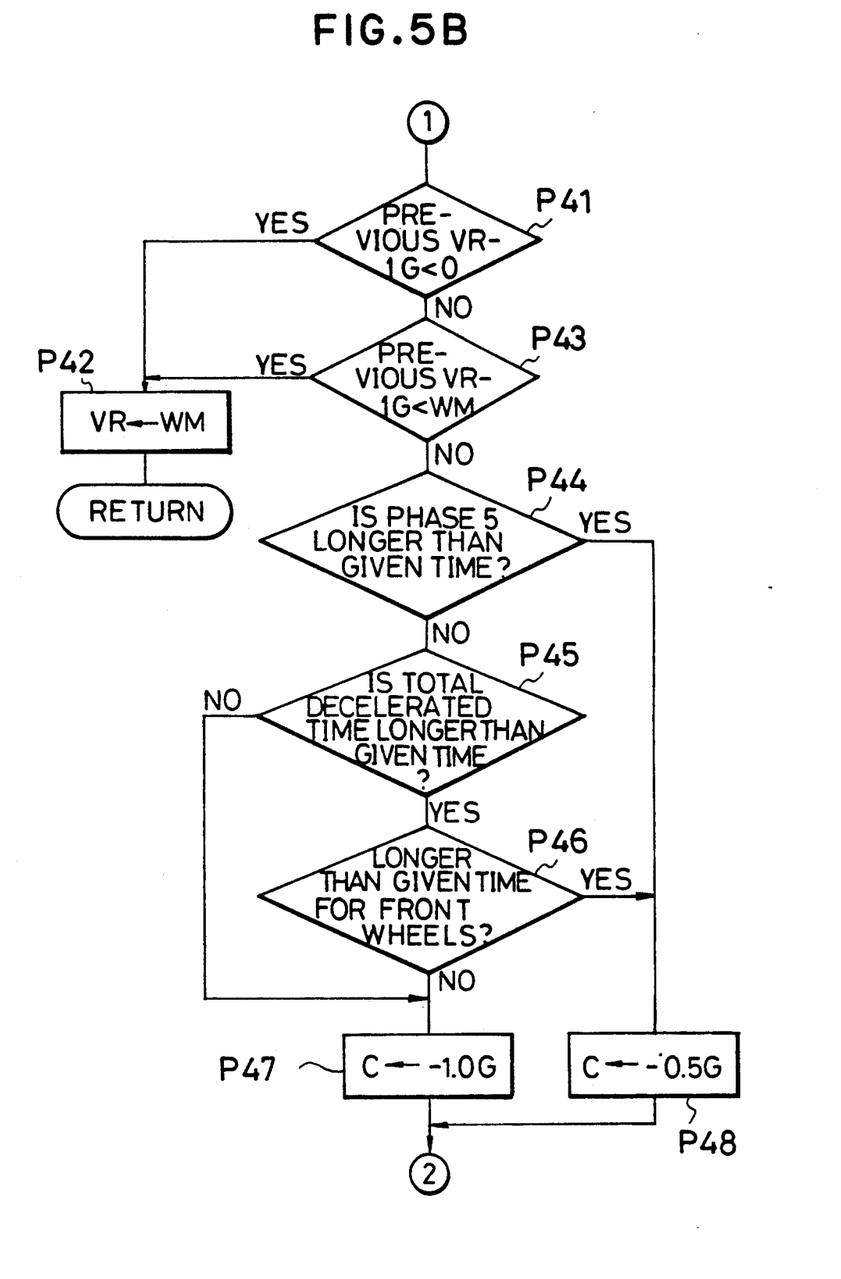

FIGS. 5A and 5B show the practices for assuming the vehicle body speed corresponding to the contents of the control at step P120 in FIG. 3.

First, at step P22 of FIG. 5A, the wheel speeds of all the wheels 1FR, 1FL, 1RR and 1RL are detected and the fastest one out of the four wheels is set as a maximum wheel speed WM. Then, at step P23, a decision is made to determine if the maximum wheel speed WM is smaller than the latest assumed vehicle body speed, i.e. the previous assumed vehicle body speed VR. When it is decided at step P23 that the maximum wheel speed WM is not smaller than the previous assumed vehicle body speed VR, then the program flow goes to step P24 at which a further decision is made to determine if the ABS control is currently in progress.

When it is decided at step P24 that no ABS control is performed, then a decision is made at step P25 to determine if the wheel speed of each of the wheels 1FR, 1FL, 1RR and 1RL is larger than the previous assumed vehicle body speed VR. When the result of decision at step P25 is found in the negative, then the program flow goes to step P26 at which an amount of the assumed vehicle body speed to be renewed, i.e. a renewal amount C, is set to zero (C←0), followed by proceeding to step P27 at which the renewal amount C is added to the previous assumed vehicle body speed VR to thereby give a current assumed vehicle body speed VR. In this case, the previous assumed vehicle body speed VR is set as the current (next) assumed vehicle body speed VR.

When it is decided at step P25 that the wheel speed of each of all the wheels is determined to be larger than the previous assumed vehicle body speed VR, then the program flow goes to step P28 at which the renewal amount C is set to 0.5 G (C←0.5 G), i.e. to a value corresponding to 0.5 G in the sampling cycle, followed by proceeding to step P27 at which the renewal amount C is added to the previous assumed vehicle body speed VR and the new assumed vehicle body speed VR is set as the next one.

On the other hand, when it is decided at step P23 that the maximum wheel speed WM is smaller than the previous assumed vehicle body speed VR or when it is decided at step P24 that the ABS control is currently in progress, then a decision is made at step P29 to determine if the maximum wheel speed WM is larger than the sum obtained by adding 5 G to the previous assumed vehicle body speed VR. When it is decided at step P29 that the maximum wheel speed WM is larger than the sum, then the renewal amount is set at step P30 to 1.5 G (C← 1.5 G), followed by proceeding to step P27 at which the next assumed vehicle body speed VR is set by adding the renewal amount C to the previous assumed vehicle body speed VR. It is to be noted herein that the practices at steps P29 and P30 are implemented when the extent to which the wheel speed is increased is so extremely high that the road surface friction coefficient $\mu$ is high. Hence, in this case, a sufficient magnitude of the braking force is intended to be ensured by suppressing the assumed vehicle body speed VR from elevating (i.e., for instance, 5 G is reduced down to 1.5 G) and preventing the braking oil pressure from being reduced.

When it is decided at step P29 that the maximum wheel speed WM is not larger than the sum of the previous assumed vehicle body speed VR plus 5 G, then the program flow goes to step P41 in FIG. 5B at which a decision is made to determine if the difference obtained by subtracting 1 G from the previous assumed vehicle body speed VR is smaller than zero (0). When the result of decision at step P41 indicates that the difference is smaller than zero, on the one hand, it is determined that the previous assumed vehicle body speed VR is considerably small so that the maximum wheel speed WM is set at step P42 as the current (next) assumed vehicle body speed VR as it is.

When it is decided at step P41 that the difference is not smaller than zero, on the other hand, then a further decision is made at step P43 to determine if the difference is smaller than the maximum wheel speed WM. When the result of decision at step P43 is found in the affirmative, it is determined that the wheel speed is not elevating to a considerably high extent so that the maximum wheel speed WM is set at step P42 as the current (next) assumed vehicle body speed VR.

On the other hand, when it is decided at step P43 that the difference is not smaller than the maximum wheel speed WM, then a decision is made at step P44 to determine if the period of time for phase 5, i.e. the period of time for which the braking oil pressure is retained after the braking oil pressure has been reduced, continues for a predetermined period of time or longer. When the result of decision at step P44 indicates that the period of time for phase 5 is no longer than the predetermined period of time, it is considered that the road surface friction coefficient $\mu$ is so low that the necessity of reducing the braking oil pressure is considerably high. Hence, in order to make the quantity of reducing the assumed vehicle body speed small, the renewal amount C of the assumed vehicle body speed is set at step P48 to $-0.5$ G, followed by proceeding to step P27.

Figure 2:
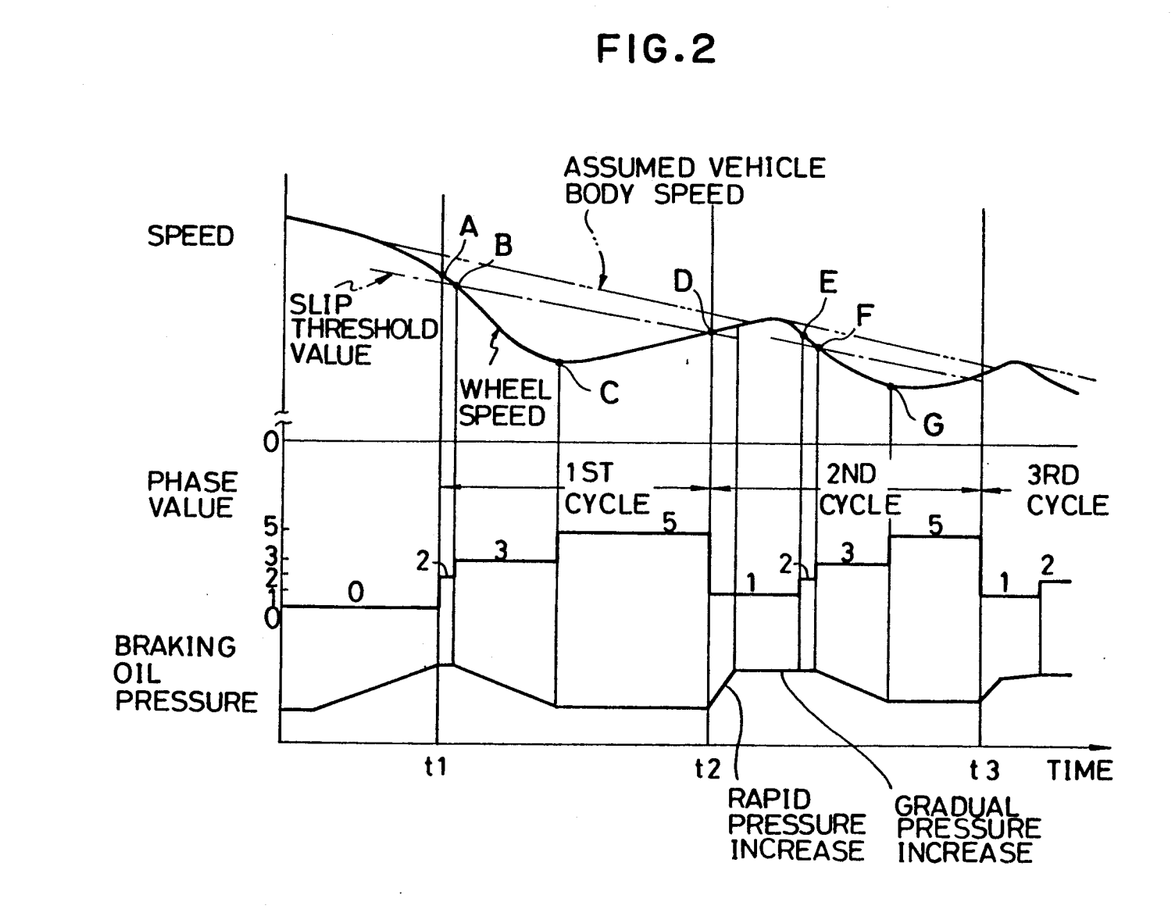
FIG. 2 is a time chart showing control of the anti-skid brake system according to the present invention.

On the other hand, when the result of decision at step P44 is in the negative, then a decision is made at step P45 to determine if a total period of time required for reducing the braking oil pressure in one control cycle (as shown in FIG. 2) immediately before the decision is longer than a predetermined period of time. When it is decided at step P45 that the total period of time is not longer than the predetermined value, it is considered that the necessity of reducing the braking oil pressure is very low or little exists, then the program flow goes to step P47 at which the renewal amount C of the assumed vehicle body speed is set to $-1.0$ G, followed by proceeding to step P27.

If the result of decision at step P45 is found in the affirmative, then the program flow goes to step P46 at which the total period of time required for reducing the braking oil pressure per one ABS control cycle (FIG. 2) immediately before the decision relating to each of the right-hand and left-hand front wheels 1FR and 1FL is longer than the predetermined period of time. When it is decided at step P46 that the total period of time is longer than the predetermined period of time, on the one hand, it is determined that the braking oil pressure should be reduced with high necessity so that the program flow goes to step P48 at which the renewal amount C is set to $-0.5$ G. When it is decided at step P46 that the total period of time is not longer than the predetermined period of time, on the other hand, then the program flow goes to step P47 as it is.

It is to be noted herein that, as the assumed vehicle body speed becomes higher even if the actual vehicle body speed is equal to the wheel speed, it is decided that there is the stronger tendency of locking the wheel, thereby increasing the frequency or the quantity for reducing the braking oil pressure. Further, when the automotive vehicle is travelling on a road with a low road surface friction coefficient $\mu$, such as an ice-covered road, the tendency of locking the wheel becomes so strong that the braking distance becomes longer.

In other words, with the fact taken in this embodiment into account that the period of time required for retaining the braking force after the braking force has been controlled to be decreased becomes longer as the road surface friction coefficient $\mu$ becomes smaller, the quantity in which the assumed vehicle body speed is changed from the previous vehicle body speed upon renewal of the assumed vehicle body speed is so arranged as to become smaller, i.e. the renewal amount in which the assumed vehicle body speed is corrected from the previous vehicle body speed becomes smaller, for example, as seen at steps P44, P47 and P48 in FIG. 5B. This control makes the quantity of changing the assumed vehicle body speed in a decreasing direction small, thereby making the control for increasing the braking force unlikely to be conducted. This ensures the prevention of the wheel from being locked particularly on a low road surface friction coefficient $\mu$ and shortens the braking distance.

In instances where the braking oil pressure is reduced to a very low level during the ABS control or where the state of the road surface is changed from a low road surface friction coefficient $\mu$ to a high one, the wheel speed may be increased rapidly after releasing the reduction of the pressure and the assumed vehicle body speed may become too high. If such a rapidly increased wheel speed is employed as the assumed vehicle body speed, the pressure may then be reduced to a level larger than required so that it is disadvantageous from the point of view of shortening the braking distance. In this embodiment, it is preferred that, when it is decided that the maximum wheel speed exceeds the previous assumed vehicle body speed by the predetermined value or more, the value obtained by adding a predetermined renewal value set as a value smaller than the predetermined value to the previous assumed vehicle body speed is set during the ABS control as the next (current) assumed vehicle body speed (as seen at steps P29 and P30 in FIG. 5A). This prevents the assumed vehicle body speed from being renewed to an excessively large value during the ABS control and permits the ABS control to be conducted in an appropriate fashion.

Further, it is preferred that the maximum wheel speed is set as the current (next) assumed vehicle body speed (as seen at steps P42 and P43 in FIG. 5B) when the maximum wheel speed is larger than the comparison value set as a value smaller by a predetermined value than the previous assumed vehicle body speed. In other words, it is preferred to set the maximum wheel speed as the current (next) assumed vehicle body speed in renewing the assumed vehicle body speed in either of an increasing or decreasing direction as long as the maximum wheel speed does not vary to an extremely large extent compared with the previous assumed vehicle body speed.

The processes at steps P42 and P43 in FIG. 5B are construed as containing the case of renewing the maximum wheel speed WM as the assumed vehicle body speed VR because the difference obtained by subtracting 1 G from the assumed vehicle body speed VR becomes smaller than the maximum wheel speed WM when the assumed vehicle body speed VR is smaller than the maximum wheel speed WM.

It is to be understood that the present invention is not construed as being restricted to those described hereinabove, which are described merely for illustrative purposed, and as encompassing all variations, changes, and modifications within the spirit and scope of the present invention.

What is claimed is:

1. An anti-skid brake system for an automotive vehicle, comprising:
   wheel speed detecting means for detecting a wheel speed of each wheel independently;
   assumed vehicle body speed determining means for determining assumed vehicle body speeds based on the wheel speed of each wheel detected by the wheel speed detecting means;
   slip value determining means for determining a slip value of a predetermined wheel on the basis of the wheel speed of the predetermined wheel detected by the wheel speed detecting means and the assumed vehicle body speed determined by the assumed vehicle body speed determining means; and
   braking force controlling means which controls braking force by increasing, holding and decreasing brake pressure during an ABS control cycle for the predetermined wheel so as not to lock the predetermined wheel at the moment of braking on the basis of the slip value determined by the slip value determining means, wherein prior to the ABS control cycle being performed by the braking force controlling means and when the wheel speed of each wheel detected by the wheel speed detecting means is equal to or smaller than a previous assumed vehicle body speed determined by the assumed vehicle body speed determining means, a next assumed vehicle body speed is maintained as the previous assumed vehicle body speed.

2. An anti-skid brake system as claimed in claim 1, wherein the assumed vehicle body speed determining means maintains the next assumed vehicle body speed as the previous assumed vehicle body speed prior to the ABS control cycle being performed by the braking force controlling means and when the wheel speed of each wheel detected by the wheel speed detecting means is equal to or smaller than the previous assumed vehicle body speed determined by the assumed vehicle body speed determining means, thereby preventing the next assumed vehicle body speed from becoming larger than the previous assumed vehicle body speed.

3. An anti-skid brake system as claimed in claim 2, wherein the assumed vehicle body speed determining means determines the next assumed vehicle body speed by adding a predetermined value to the previous assumed vehicle body speed prior to the ABS control cycle being performed by the braking force controlling means and when the wheel speed of each wheel detected by the wheel speed detecting means is larger than the previous assumed vehicle body speed determined by the assumed vehicle body speed determining means.

4. An anti-skid brake system as claimed in claim 2, wherein the next assumed vehicle body speed is maintained as the previous assumed vehicle body speed, when a maximum wheel speed detected by the wheel speed detecting means is larger than the previous assumed vehicle body speed determined by the assumed vehicle body speed determining means.

5. An anti-skid brake system as claimed in claim 1, wherein the braking force controlling means performs control for reducing, increasing and retaining the braking force.

6. An anti-skid brake system as claimed in claim 5, wherein the braking force controlling means performs the control for at least one of retaining the braking force after the control for reducing the braking force and after the control for increasing the braking force.

7. An anti-skid brake system as claimed in claim 6, wherein the next assumed vehicle body speed is adjustable at a smaller rate during operation of the braking force controlling means when a total period of time required for retaining the braking force in a control cycle is equal to or longer than a predetermined period of time.

8. An anti-skid brake system as claimed in claim 6, wherein the next assumed vehicle body speed is changed at a smaller rate during operation of the braking force controlling means when a total period of time required for reducing the braking force in a control cycle is longer than a predetermined period of time.

9. An anti-skid brake system as claimed in claim 5, wherein the braking force controlling means performs the control for retaining the braking force at the moment of starting the control.

10. An anti-skid brake system as claimed in claim 9, wherein the braking force controlling means starts the control at the moment when the predetermined wheel reaches a predetermined magnitude of deceleration.

11. An anti-skid brake system as claimed in claim 5, wherein the braking force controlling means performs the control for reducing the braking force when the slip value of the predetermined wheel exceeds a predetermined threshold value in a direction in which a tendency of locking the wheel increases.

12. An anti-skid brake system as claimed in claim 5, wherein the braking force controlling means performs the control for increasing the braking force when the slip value of the predetermined wheel exceeds a predetermined threshold value in a direction in which a tendency of locking the wheel decreases.

13. An anti-skid brake system as claimed in claim 5, wherein the next assumed vehicle body speed is changed at a smaller rate during operation of the braking force controlling means when a period of time required for retaining the braking force after a decrease in the braking force is equal to or longer than a predetermined period of time.

14. An anti-skid brake system as claimed in claim 1, wherein:

the assumed vehicle body speed determining means comprises first assumed vehicle body speed determining means and second assumed vehicle body speed determining means;

wherein the first assumed vehicle body speed determining means determines a maximum wheel speed detected by the wheel speed detecting means as the next assumed vehicle body speed when the maximum wheel speed exceeds the previous vehicle body speed; and wherein, when the maximum wheel speed to be detected by the wheel speed detecting means during the control by the braking force controlling means exceeds the previous vehicle body speed by a predetermined value, the second assumed vehicle body speed determining means determines a value obtained by adding a predetermined renewal value to the previous vehicle body speed.

15. An anti-skid brake system as claimed in claim 14, wherein the first assumed vehicle body speed determining means determines the maximum wheel speed as the next assumed vehicle body speed when the maximum wheel speed is larger than the previous assumed vehicle body speed less a further predetermined value.

16. An anti-skid brake system as claimed in claim 14, wherein the first assumed vehicle body speed determining means determines the maximum wheel speed as the next assumed vehicle body speed when the previous assumed vehicle body speed is smaller than a predetermined value.

* * * * *